United States Patent
Keeney

[11] Patent Number: 5,163,479
[45] Date of Patent: Nov. 17, 1992

[54] PRESSURE EQUALIZING SYSTEM AND VALVE

[75] Inventor: Walter W. Keeney, Allentown, Pa.

[73] Assignee: The BOC Group, Inc.

[21] Appl. No.: 799,388

[22] Filed: Nov. 27, 1991

Related U.S. Application Data

[63] Continuation-in-part of Ser. No. 639,983, Jan. 11, 1991, Pat. No. 5,107,898.

[51] Int. Cl.$^5$ .............. F16K 11/14; G01F 23/14
[52] U.S. Cl. .................. 137/871; 251/30.01; 251/129.04; 73/299; 62/50.7
[58] Field of Search ............. 137/595, 625.18, 625.29, 137/636.4, 871, 625.64; 251/30.01, 30.05, 129.04; 73/299, 302, 295; 62/50.4, 50.7

[56] References Cited

U.S. PATENT DOCUMENTS

| | | | |
|---|---|---|---|
| 2,068,135 | 1/1937 | Howse | 73/299 |
| 2,361,440 | 10/1944 | Williamson | 73/299 |
| 3,371,534 | 3/1968 | Akeley | 73/299 |
| 3,537,479 | 11/1970 | Nelson | 137/636.4 |
| 3,763,891 | 10/1973 | Stiltner | 137/625.18 |
| 3,863,810 | 2/1975 | Hanson | 137/625.18 X |
| 4,020,690 | 5/1977 | Samuels et al. | 73/299 |
| 4,066,102 | 1/1978 | Tandrup | 137/625.64 |
| 4,194,535 | 3/1980 | Galland et al. | 137/595 X |
| 4,472,105 | 9/1984 | Takiguchi et al. | 251/31 |
| 4,630,478 | 12/1986 | Johnson | 73/299 |
| 4,862,734 | 9/1989 | Elderton | 73/299 |

Primary Examiner—John Rivell
Attorney, Agent, or Firm—John Lezdey

[57] ABSTRACT

There is provided a closed loop system for measuring an amount of liquid under pressure in a container. The system comprises a container holding a liquid under pressure, a novel differential valve with check valves which are connected to the container and to a differential gauge, and a means for activating the valve.

4 Claims, 4 Drawing Sheets

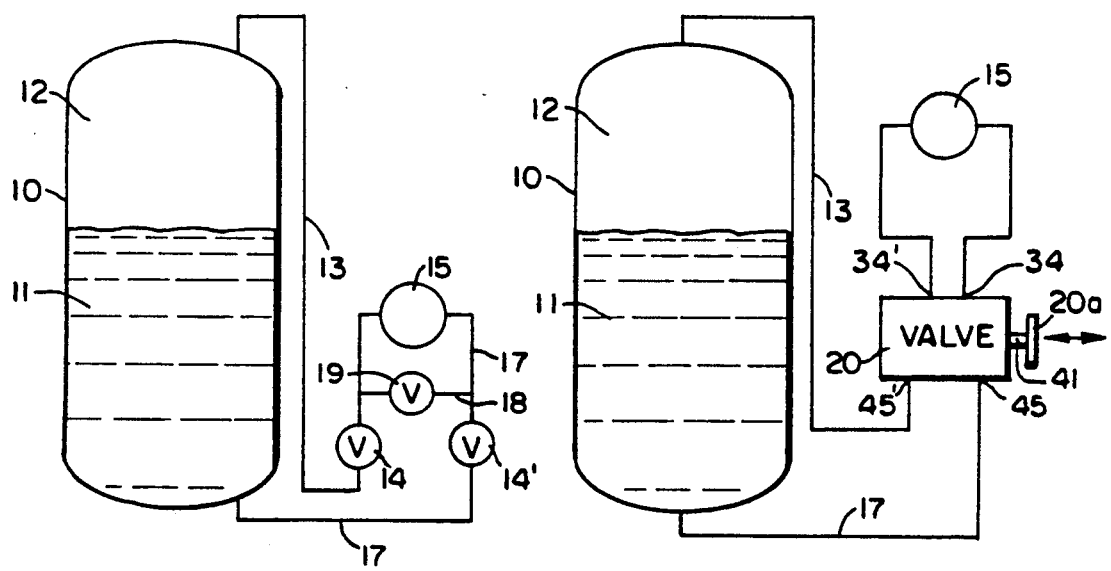
FIG. 1
PRIOR ART
FIG. 3
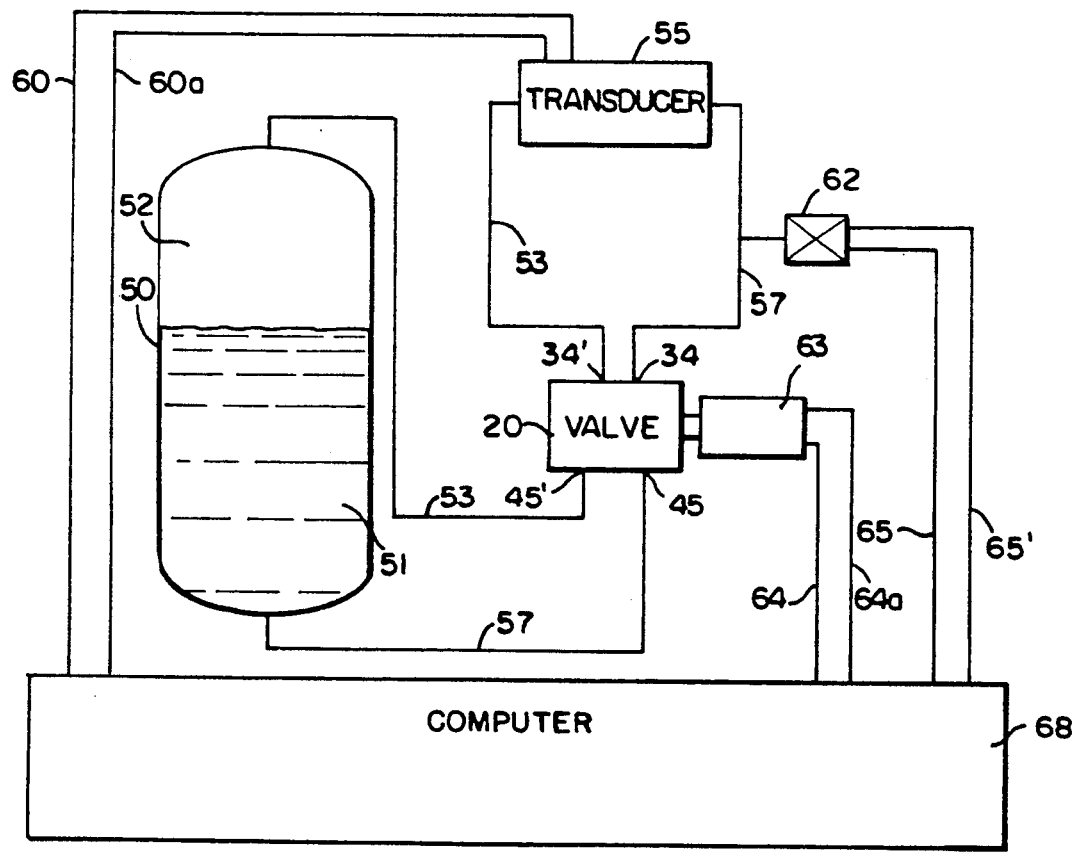
FIG. 4

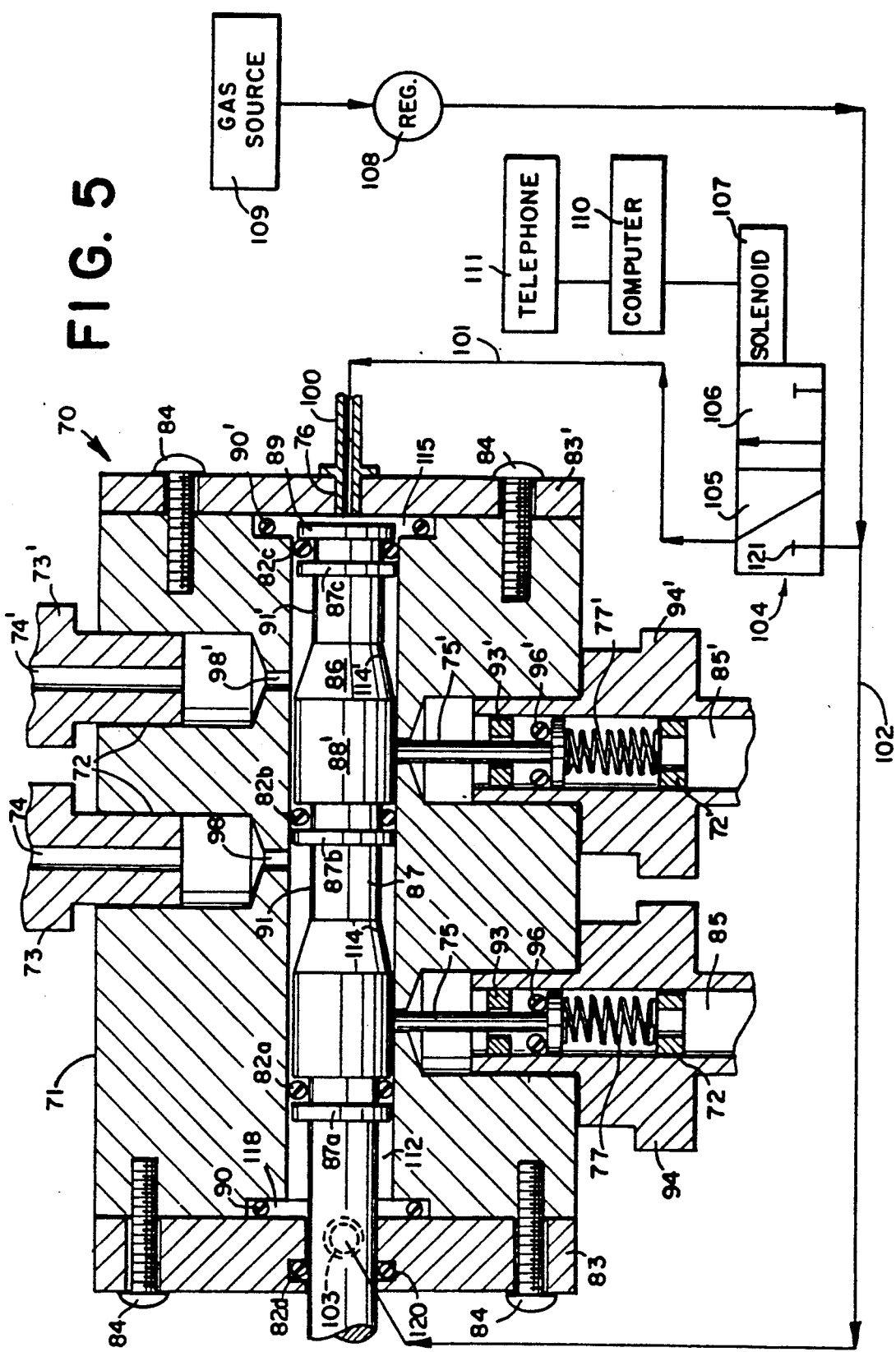

PRESSURE EQUALIZING SYSTEM AND VALVE

RELATED APPLICATIONS

This application is a continuation-in-part of application Ser. No. 639,983 filed Jan. 11, 1991 of Walter W. Keeney now U.S. Pat. No. 5,107,898.

FIELD OF THE INVENTION

The present invention relates to the containment and measurement of fluid pressures within a closed loop system. More particularly, the invention provides a liquid/pressure system utilizing a novel safety differential valve in connection with cryogenic liquid tanks, fuel tanks, air conditioning systems for buildings and flow systems which operate under elevated pressures.

BACKGROUND OF THE INVENTION

The prior art discloses patents for valves of the packed spool, lap spool or proportional flow version and valves which employ cartridge units that may be assembled outside of the valve body and moved into the bore in the body of the unit, for example, U.S. Pat. No. 4,096,880 to Lemon et al and U.S. Pat. No. 4,220,174. Such prior art constructions do not provide a valve which can be used in connection with various activating means such as solenoids, levers, pedals and the like.

U.S. Pat. No. 4,877,057 to Chirstensen discloses a pressure equalizing valve with a spool disposed in a valve body to regulate fluid communication from an inlet port to outlet ports in response to a pressure differential between first and second port disposed on first and second end faces of the valve body. However, the valve does not provide a means for differentiating pressures.

Prior to the present invention cryogenic tanks were commonly equipped with a differential pressure gauge so that an operator could gauge the amount of liquid in the tank. One side of the gauge was connected to the top of the tank and the other side of the gauge was connected to the bottom. The amount of liquid in the tank was then determined by inference by the difference of gauge pressure. In the system, the gauge was protected by an equalizer valve which was connected to two lines which ran on both sides of the gauge.

In operation, the operator must open the equalizer valve to allow the gauge to come to an equilibrium on both sides of the gauge. After the equalizer is opened, the blocking valves may be closed. This will permit the gauge to be calibrated or removed from the system. To reverse the operation and place the gauge in service requires the blocking valves to be opened and then the equalizer valve to be closed. If this is not performed in proper sequence in either operation, an inadvertent high pressure may occur on one side of the gauge and inactivate the gauge.

It should be understood that the term "liquid" as used herein can also refer to a gas which is the result of the liquid being heated to ambient temperature as is the case with cryogenic fluids.

SUMMARY OF THE INVENTION

According to the present invention there is provided a closed loop system for measuring an amount of liquid under pressure in a container. The system comprises a container holding a liquid under pressure, a novel differential valve connected by a line to the liquid holding portion of the container and a line to the gas holding portion of the container, a differential gauge associated with said differential valve, and a means for activating the differential valve Th differential valve used in the invention is capable of providing a zero differential pressure. The differential valve comprises a primary valve body closed at one end and open at the other end. The valve body has an inlet port for a gas, an inlet port for a liquid, and an outlet port for the gas and an outlet port of the liquid (gas) at diametrically opposed positions relative to inlet ports.

A valve plunger or spool is mounted for longitudinal movement within a bore in the primary valve body. The plunger has a pair of reduced diameter portions and ramps forming valving surfaces. A circumferential notch is formed at each end of the plunger and a intermediate circumferential notch spaced between said reduced portions.

O-rings are mounted in each of said notches. The O-rings at each end cooperate with the inside of the valve body to prevent escape of gas from inside of the valve body. The O-ring in the intermediate notch cooperates with the valve body to separate pressures which come through the inlet ports. There is provided check valves which are associated with each inlet.

The check valves comprise a valve body having a bore, and stop means at upper and lower ends of the bore. A plunger is provided within each of said check valve bores. Each plunger is associated with the ramp on the primary valve plunger. An O-ring is placed on the check valve plunger for forming a seal with the stop means at the upper end of the bore. A spring means is provided for normally urging the check valve plunger forward in contact with the ramp.

The means for activating the plunger of the primary valve to change direction and move longitudinally within the bore may be a manual means, a solenoid or a pneumatic device. That is, any device which can provide linear motion to the plunger to achieve zero differential can be used so as to have a fully automated system.

In accordance with an embodiment of the invention a remote operated closed loop system is provided wherein there is included an electronic multi-valved means. The electronic multi-valved means has a solenoid which is connected to a computer, and a normally closed valve operated by the solenoid. The normally closed valve has a gas inlet connected to the gas source which leads to the gas inlet of the primary valve body and a gas outlet which is connected to an enlarged chamber in the primary valve body. Upon activation of the solenoid, the normally closed valve of the electronic multi-valved means opens and gas enters the enlarged chamber whereby the plunger in the primary valve is shifted and the differential gauge is calibrated.

It is therefore a feature of the invention to provide a system for measuring an amount of liquid under pressure.

It is a further feature of the invention to provide a system for measuring an amount of liquid in a cryogenic container.

It is a still further feature of the invention to provide a novel valve which can be used in the system of the invention.

It is yet another feature of the invention to provide a system which can be controlled by operation of the valve by remote means.

Other features and a fuller understanding of the invention will be had by referring to the following description and claims taken in conjunction with the accompanying drawings.

BRIEF DESCRIPTION OF THE DRAWINGS

FIG. 1 illustrates a prior art system for determining the amount of liquid in a cryogenic tank;

FIG. 3 illustrates the system of the present invention for determining the amount of liquid in a cryogenic tank using manual controls, FIG. 4 illustrates as system of the invention which is automated, and FIG. 5 illustrates an automated system of the invention which is actuated from a remote source.

DESCRIPTION OF THE PREFERRED EMBODIMENTS

Figure 2A:
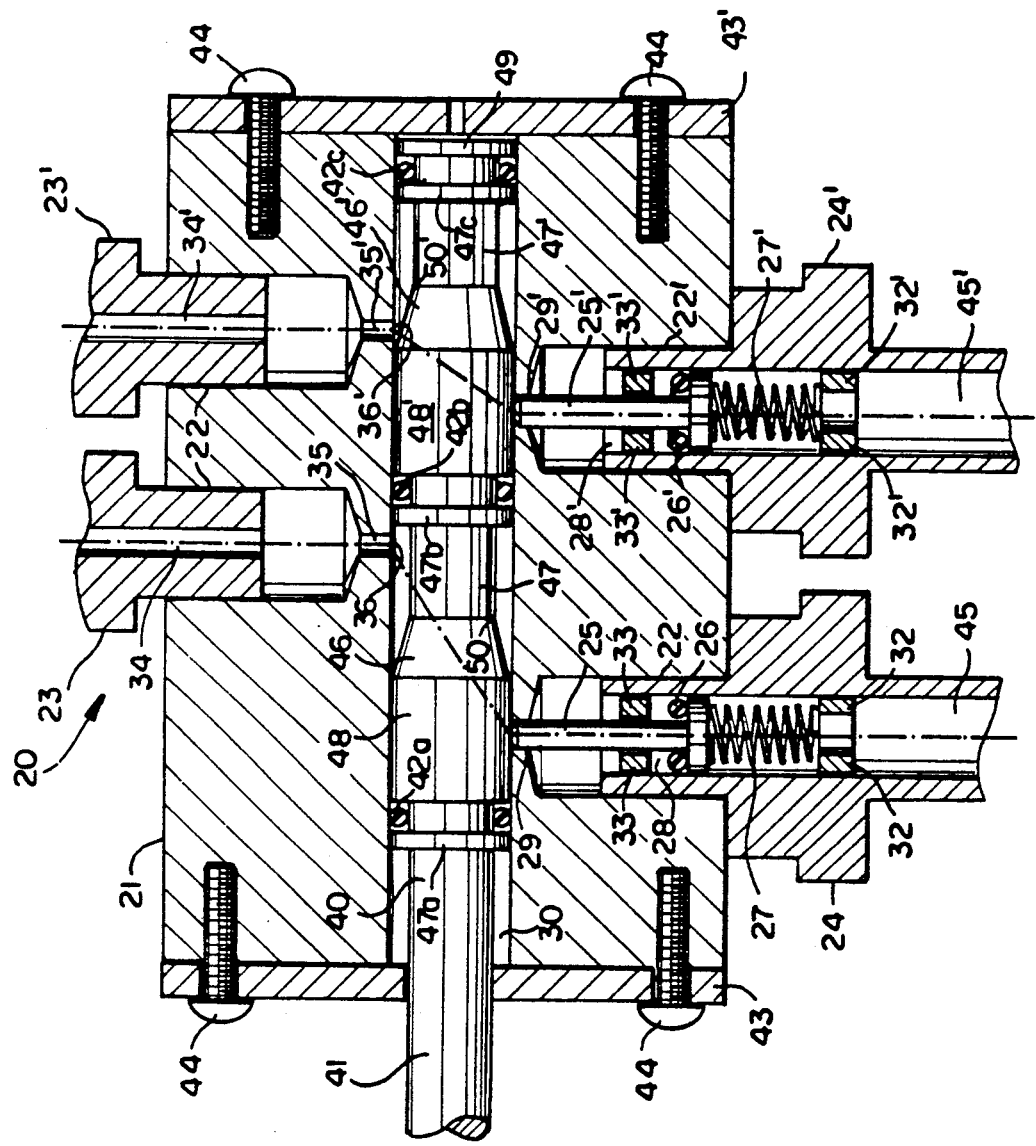
FIG. 2A is a cross-sectional view of the novel differential valve of the invention in the "spool in" position.

Although specific terms are used in the following description for the sake of clarity, these terms are intended to refer only to the particular structure of the invention selected for illustration in the drawings, and are not intended to define or limit the scope of the invention.

FIG. 1 illustrates the prior art system for a operator to gauge the amount of liquid in a cryogenic tank. A cryogenic tank 10 having therein a liquid portion 11 and a gaseous portion 12 is provided with a line 13 at the top of the tank 10 and a line 17 at the bottom of the tank. The line 13 leads to one side of a differential gauge 15 and the line 17 leads to the other side of the gauge 15 so that the amount of liquid can be determined by the difference of pressure on the gauge 15.

The gauge 15 is protected by a blocking valve 14 in line 13 and a blocking valve 14' in line 17. An equalizing valve 19 is connected to lines 13 and 17 through line 18 intermediate the gauge 15 and the blocking valves 14,14'.

In operation the operator must open the equalizer valve 19 to allow the gauge 15 to come to equilibrium on both sides of the gauge 15. After the equalizing valve 19 is opened, the blocking valves 14, 14' are closed. This will allow the operator to adjust, calibrate or remove the gauge from the system.

To reverse the operation and place the gauge 15 in service, the blocking valves 14, 14' must be opened and then the equalizing valve 19 closed. If this is not performed in proper sequence in either operation, an inadvertent high pressure will be seen on one side of the gauge 15 and injure the gauge 15.

Figure 2B:
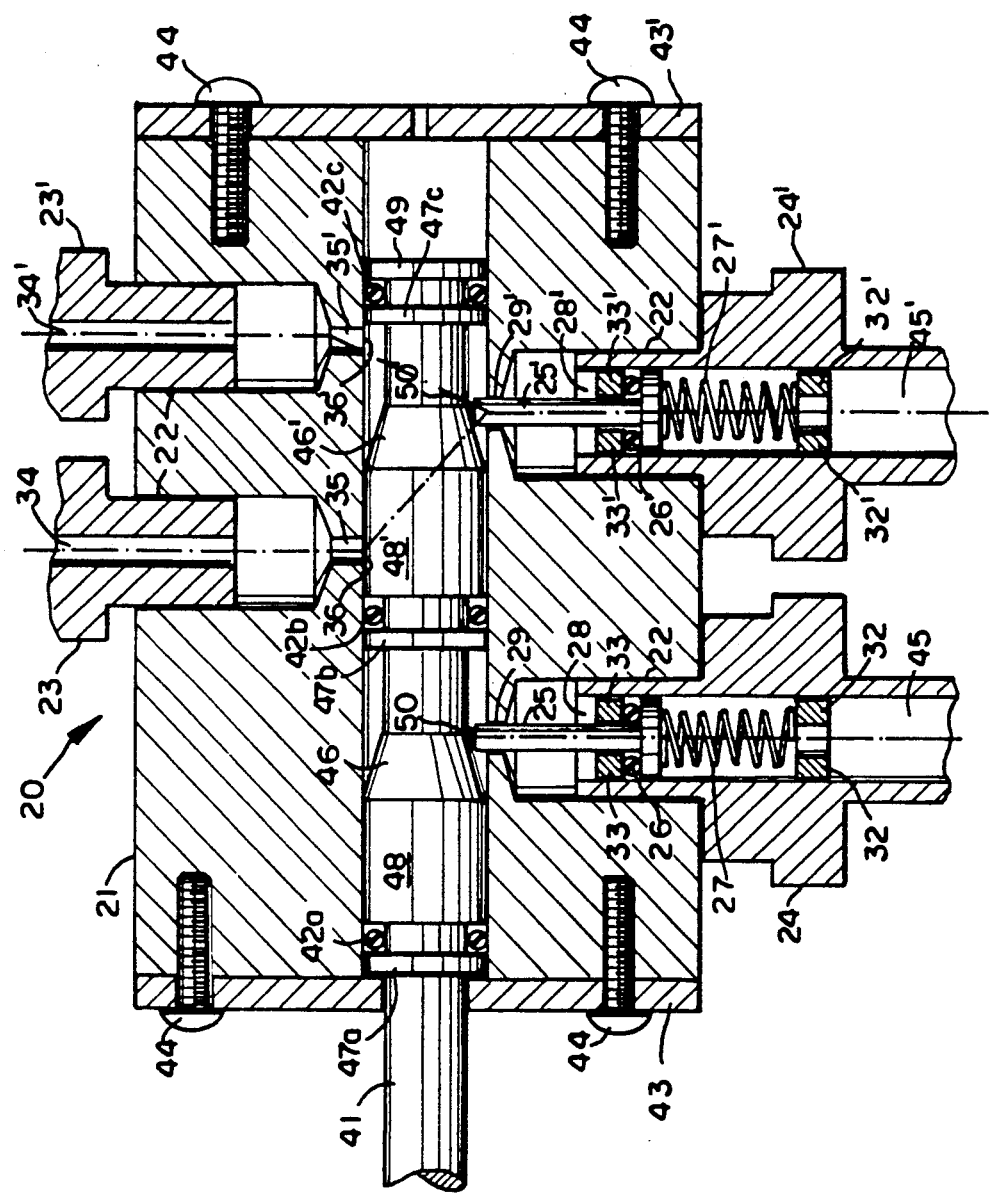
FIG. 2B is a cross-sectional view of the valve of FIG. 2A in the "spool out" position.

As seen in FIGS. 2A and 2B, the novel differential valve 20 of the invention comprises a housing 21 having a longitudinal bore 30 in which a spool or plunger 40 is mounted for longitudinal movement.

On the upper portion of the housing 21 are a pair of bores 22 in which are placed connectors 23, 23' that form outlets for the pressurized gases and liquids. The liquid and gases from bore 30 pass through the openings 36, 36' into chambers 35, 35' which are associated with the bores 34, 34' of the connectors 23, 23'.

On the lower portion of the valve 20 is the gas inlet chamber 22' in which there is mounted a check valve 24' with a connector 45'. The check valve 24' has a plunger 25' mounted therein which is normally urged forward against the plunger 40 by a spring 27' which is mounted on lower stop means 32'. An O-ring 26' is mounted on the plunger 25' so as to form a seal with an upper stop means 33' when the plunger 25' is in the most forward position as shown in FIG. 2B. The gas enters the chamber 30 of the valve 20 through opening 29' when the plunger 25' is in the position shown in FIG. 2A.

Adjacent to the gas inlet chamber 22' is liquid inlet chamber 22. Mounted in chamber 22 is a check valve 24 with a connector 45. The check valve 24 has mounted therein a plunger 25 which is normally urged forward by a spring 27 that is mounted on lower stop means 32. An O-ring 26 is mounted on plunger 25 so as to form a seal with an upper stop means 33 when the plunger 25 is in its most forward position as shown in FIG. 2B. The liquid enters through check valve 24 into the chamber 30 of the valve 20 by means of opening 2 when the plunger 25 is in the position shown in FIG. 2A.

The spool or plunger 40 which is located within the bore 30 of the valve body or housing 21 contains a stem 41 which can be attached for automatic or manual control to move the plunger 40 within the bore 30. The portion of the plunger 40 extending into the bore 30 is formed to provide two valving areas walls 47b and 47c which cooperate with the O-rings 42a, 42b, 42c that separate the pressures and maintain them within the valve bore 30. There is provided reduced portions 50 and 50' in each valving area and ramps 46, 46' on which check valve plungers 25, 25' ride respectively. The cylindrical portions 48, 48' form the surfaces on which the plungers 25, 25' ride respectively when the plungers 25, 25' are in the open position as shown in FIG. 2A.

The front of the plunger 40 has a wall 49 which together with wall 47C forms a notch for the O-ring 42C. The wall 49 abuts a plate 43' which is fasted to the valve body 21 with bolts 44. The wall 49 may be apertured to release any escaped pressures. The wall 49 abuts the plate 43' when the plunger 40 is in the "spool in" position shown in FIG. 2A.

At the rear of the valve 20 is an apertured plate 43 fastened by bolts 44 through which the stem 41 of the plunger 40 extends. The plunger 40 is provided with a wall 47C form a notch with the cylindrical portion 48 for O-ring 42A. The wall 47A abuts the plate 43 when the plunger 40 is in the "spool out" position shown in FIG. 2B.

Operation of Valve

In operation in a system containing a tank with fluid under pressure and a gauge as shown in FIG. 3, the valve 20 controls the operation of the check valves 24, 24'. The spool or plunger 40 has two outside O-rings 42a and 42c which control the escape of internal gases from inside the valve body. The center O-ring 42b separates the pressures between the two sides of a differential gauge in the system it is employed (as shown in FIG. 3). Thus, pressure from a liquid or gas which comes through check valve 24 will proceed through one side of the valve 20. The outlets of the gas and liquid (gas) are connected to their respective sides of a differential pressure gauge or transducer. In the operating condition, the spool or plunger 40 also hold the two check valves 24, 24' in the open condition as shown in FIG. 2A.

As the plunger 40 moves to the "spool out" position shown in FIG. 2B, the center O-ring 42b is moved over opening 36 going to one side of a gauge. Now both sides of a gauge to which the outlets are connected are between two of the O-rings 42b, 42c. This effectively equalizes the pressures to both sides of the gauge. That is, one side of the tank containing the pressurized liquid and both sides of the gauge are now connected. As the plunger 40 is moved from the position shown in FIG. 2A, the check valves 24, 24' are now being forced by the springs 27, 27' and the pressures from the tank to the closed position shown in FIG. 2B as the plungers 25, 25' slide down the ramps 46, 46' the plungers 25, 25' will close before bottoming out on the minimum cut surfaces 47, 47' of the plunger 40. In the completely closed positions, the gauge can be removed from the system without any leakage of gas from the tank.

The gauges can be removed from the system due to malfunctions of gauge, leaks in the gauge, and for calibration. There are also new devices which may be incorporated into the system such as liquid level electronic units and telemetry units which can replace the older gauges. There must be a means of replacing one unit for another without draining the entire tank, or allowing high pressure gas to escape. The present systems provides such a means.

Moving the plunger 40 in the reverse direction, the plunger 40 will first open the check valves 24, 24' and allow the gases from the tank to pressurize both sides of the gauge from only one of the tank lines. The center O-ring 42b is so positioned that both sides of the gauge will see the same pressure. As the plunger 40 is further moved, the O-ring 42b will again cross the opening 36 and again place the gauge in an operating condition. Thus, the valve 20 can never be out of sequence and the check valves 25, 25' stop escaping gas.

A system according to the present invention is illustrated in FIG. 3 in connection with a cryogenic tank 10 which contains a cryogenic liquid under pressure. A line 13 leads from the gaseous portion 12 of the gas inlet connector 45 of the differential valve 20 shown in FIGS. 2A and 2B. A line 17 is connected from the bottom of the tank 10 to the valve 20 through connector 45. The liquid outlet of the valve 20 is through connector 23' which is connected to one side of a differential gauge 15. The gaseous outlet of the valve 20 is through connector 23 which is connected to the other side of the differential gauge 15. A manual means 20a connected to the spool or plunger 40 of valve 20 through stem 41 controls the position of the plunger 40.

In the system illustrated in FIG. 3, when the valve 20 is at zero differential and the plunger or spool 40 is in the "spool out" position as illustrated in FIG. 2B, the gauge 15 may be removed.

FIG. 4 illustrates an automated system of the invention. A tank 50 which contains a liquid 51 under pressure is connected through line 53 from the gas 52 containing portion of the tank 50 to valve 20 of the invention through the gas inlet 45'. The bottom of the tank 50 is connected through line 57 to the liquid connector of the valve 20. The gas outlet 34' of the valve is connected through line 53 to one side of a differential transducer 55. The liquid outlet 34 is connected through line 57 to the other side of the transducer 55. An on/off purge means 62 may be connected to line 57 and through lines 65, 65' to a computer 68 for pressure calibration. The transducer 55 can also be connected to the computer 68 through lines 60, 60a. A control 63 for the spool or plunger 40 of the valve 20 may be manual or connected to computer 68 for remote control.

As shown in FIG. 5, a differential valve 70 is provided which can be employed in a remote operated closed loop system.

Similar to the valve of FIGS. 2A and 2B, the differential valve 70 comprises a housing 71 having a longitudinal bore 112 in which a spool or plunger 80 is mounted for longitudinal movement.

On the upper portion of the housing 71 are a pair of bores 72 in which are placed connectors 73, 73' that form outlets for the pressurized gases and liquids. The liquid and gases from bore 112 pass through openings into chambers 98, 98' which are associated with the bores 74, 74' of the connectors 73, 73'.

On the lower portion of the valve 70 is the gas inlet chamber 72' in which there is mounted a check valve 94' with a connector 85'. The check valve 94' has a plunger 75' mounted therein which is normally urged forward against the plunger 80 by a spring 77' which is mounted on lower stop means 72'. An O-ring 96' is mounted on the plunger 75' so as to form a seal with an upper stop means 93' when the plunger 75' is in the most forward position as shown in FIG. 5. The gas enters the chamber 112 of the valve 70 through opening when the plunger 75' is in the same position shown in FIG. 2A.

Adjacent to the gas inlet chamber 85' is liquid inlet chamber 72. Mounted in chamber 72 is a check valve 94 with a connector 85. The check valve 94 has mounted therein a plunger 75 which is normally urged forward by a spring 77 that is mounted on lower stop means 72. An O-ring 96 is mounted on plunger 75 so as to form a seal with an upper stop means 93 when the plunger 75 is in its most forward position as shown in FIG. 5. The liquid enters through check valve 74 into the chamber 112 of the valve 70 by means of an opening when the plunger 75 is in the position shown in FIG. 5.

The spool or plunger 80 which is located within the bore 112 of the valve body or housing 71 contains a stem 81 which is automatically or manually controlled to move the plunger 80 within the bore 112. The portion of the plunger 80 extending into the bore 112 is formed to provide two valving area walls 87b and 87c which cooperate with the O-rings 82a, 82b, 82c that separate the pressures and maintain them within the valve bore 112. There is provided reduced portions 114 and 114' in each valving area and ramps 86, 86' on which check valve plungers 75, 75' ride respectively. The cylindrical portions 88, 88' form the surfaces on which the plungers 75, 75' ride respectively when the plungers 75, 75' are in the open position as shown in FIG. 5.

The front of the plunger 80 has a wall 89 which together with wall 87C forms a notch for the O-ring 82C. The wall 89 abuts a plate 83' which is fasted to the valve body 71 with bolts 84. The wall 89 contains an aperature 76 and a connector 100 that is connected to gas line 101. The wall 89 abuts the plate 83' when the plunger 80 is in the "spool in" position shown in FIG. 5 and is within an enlarged chamber 115 which contains O-ring 90'.

At the rear of the valve 80 is an aperatured plate 83 fastened by bolts 84 through which the stem 81 extends. Plate 83 has an opening 103 which is connected to a line 102 through which a gas enters into chamber 118 which contains O-rings 90 and urges the plunger 80 into the forward position. An O-ring 82d in chamber 120 of the plate 83 prevents the escape of gas.

The line 101 is connected to an electronic three-way valve 104. The electronic valve 104 has an exhaust port 106, pressure port 105, and a solenoid 107. The valve 105 is a three-way normally closed valve with an inlet 121 from line 102 and an outlet to line 101.

Gas line 102 is connected to a gas source 109, for example, a nitrogen tank, through a regulator 108.

The solenoid 107 is connected to receive a signal from a computer or microprocessor 110 which will process signals from a telephone or other electronic means 111 to activate the solenoid 107. When there are no signals, the normally closed valve 106 will be in the state shown in FIG. 5 and exhaust the spool chamber 115 to the atmosphere through line 101. When the solenoid 107 is energized, the pressure of the gas entering through inlet 121 will then shift the valve 105 so that the gas passes through line 101 and into chamber 115. An inbalance occurs since there is now placed the same pressure on the spool head 89 as found on the other end from the gas pressure entering aperature 103. This inbalance will operate against the pressure on the left of the plunger 80 but because of the larger area it will overcome that force and cause the plunger 80 to shift to the left. This shift allows the gauge to be calibrated since there is now a zero differential pressure on the gauge. Releasing the signal on the solenoid 107 causes the introduced valve to shift back to the rest position and exhaust the chamber 115. The plunger 80 will then be shifted back to the right due to the original inbalance.

An electronic valve which can be used in the invention is the Clippard Minimatic valves and manifolds of Clippard Corp. which are 2-position 3-way control valve model numbers ETO-3M-12-VDC.

What is claimed is:

1. A remote operated closed loop system for measuring an amount of liquid under pressure in a container comprising a container holding a liquid under pressure, a differential valve connected by a line to the liquid holding portion of said container and a line to the gas holding portion of said container, a differential gauge associated with said differential valve, and a means for activating said differential valve, said differential valve comprising a primary valve body having a gas inlet at one end associated with a gas source and an enlarged chamber at the other end associated with a multi-valved electronic means, said electronic means having a solenoid connected to a computer, a normally closed valve operated by said solenoid and having a gas outlet connected with said gas source, and a gas outlet forming said association with said other end of said valve body, said valve body having an inlet port connected through said differential valve to a line to the gas holding portion of said container and an inlet port connected through said differential valve to a line to the liquid holding portion of said container, and an outlet port for the gas and an outlet port for the liquid or gas formed from the liquid at diametrically opposed positions relative to said inlet ports, a valve plunger mounted for longitudinal movement within a bore in the primary valve body, said plunger having a pair of reduced diameter portions and ramps forming valving surfaces, a circumferential notch at each end of said plunger and an intermediate circumferential notch spaced between said reduced portions, an O-ring in each of said notches, said O-rings at each end cooperating with the inside of said valve body to prevent escape of gas from inside of said valve body, said O-ring in said intermediate notch cooperating with said valve body to separate pressures, check valves associated with each inlet, said check valves comprising a valve body, having a bore and stop means at upper and lower ends of the bore, a plunger within each of said check valve bores, each plunger being associated with the ramp on said primary valve plunger, an O-ring on said check valve plunger for forming a seal with the stop means at the upper end of said bore and spring means for normally urging said check valve plunger forward, whereby upon activation of said solenoid, said normally closed valve of said electronic means opens and allows gas to enter said enlarged chamber of the primary valve body so as to shift said plunger in the primary valve body and permit said gauge to calibrate.

2. The system of claim 1 wherein said computer is telephone activated.

3. The system of claim 1 wherein said multi-valved electronic means comprises a two position three-way valve.

4. The system of claim 1 whereby the plunger in said primary valve is manually operated.

* * * * *